United States Patent [19]

Patton, Jr. et al.

[11] 3,950,317
[45] Apr. 13, 1976

[54] PROCESS FOR THE PREPARATION OF GRAFT COPOLYMER DISPERSIONS

[75] Inventors: John T. Patton, Jr., Wyandotte, Mich.; Gerhard G. Ramlow, Ludwigshafen, Germany; Louis C. Pizzini, Trenton, Mich.

[73] Assignee: BASF Wyandotte Corporation, Wyandotte, Mich.

[22] Filed: Oct. 29, 1973

[21] Appl. No.: 410,681

[52] U.S. Cl............ 260/88.3 A; 259/4 R; 260/34.2; 260/77.5 AB; 260/77.5 AA; 260/859 R
[51] Int. Cl.² ...................................... C08F 283/06
[58] Field of Search ........ 260/33.2, 33.4, 34.2, 873, 260/88.3 A; 106/316; 259/4

[56] References Cited
UNITED STATES PATENTS

| | | | |
|---|---|---|---|
| 3,383,351 | 5/1968 | Stamberger | 260/33.2 |
| 3,476,521 | 11/1969 | Wise | 259/4 |
| 3,607,821 | 9/1971 | Clarke et al. | 260/34.2 |
| 3,652,639 | 3/1972 | Pizzini et al. | 260/465.4 |
| 3,709,468 | 1/1973 | Ives | 259/4 |
| 3,751,009 | 8/1973 | Archer | 259/4 |
| 3,790,030 | 2/1974 | Ives | 259/4 |
| 3,831,904 | 8/1974 | Appeldorn et al. | 259/4 |

FOREIGN PATENTS OR APPLICATIONS

| | | | |
|---|---|---|---|
| 1,063,222 | 3/1967 | United Kingdom | 260/34.2 |
| 1,126,025 | 9/1968 | United Kingdom | 260/34.2 |

*Primary Examiner*—Allan Lieberman
*Attorney, Agent, or Firm*—Joseph D. Michaels; Bernhard R. Swick; Robert E. Dunn

[57] ABSTRACT

Graft copolymer dispersions of low viscosity and improved particle size distribution are prepared by mixing a free radical catalyst and a vinyl monomer in a static mixer and thereafter adding the catalyst-monomer mix to a polyol. The dispersions are low viscous liquids which may be advantageously employed in the preparation of polyurethanes.

8 Claims, No Drawings

3,950,317

PROCESS FOR THE PREPARATION OF GRAFT COPOLYMER DISPERSIONS

BACKGROUND OF THE INVENTION

1. Field Of The Invention

The present invention relates to stable graft copolymer dispersions of low viscosity and superior particle size distribution. More particularly, the invention relates to graft copolymer dispersions prepared by the in situ polymerization in the presence of a free radical catalyst of a vinyl monomer in a polyol.

2. Prior Art

Graft copolymer dispersions prepared from vinyl monomers and polyether polyols and the use thereof in the preparation of polyurethane polymers are well known in the art as evidenced by U.S. Pat. Nos. 3,383,351 and 3,652,659. These patents disclose various methods of preparing graft copolymer dispersions. The latter patent teaches the simultaneous addition at a steady rate of a stream of monomer and a stream of catalyst to an unsaturated polyol, while the former patent teaches charging the monomer and the polyol to a reaction vessel, heating the charge and thereafter adding the catalyst to the charge. Optionally, the polyol, monomer and catalyst can be added to a reactor and heated to initiate the polymerization. The present invention relates to an improvement in the preparation of the graft copolymer dispersions described in the aforementioned patents.

SUMMARY OF THE INVENTION

The present invention is an improvement in the process for the preparation of graft copolymer dispersions by the in situ polymerization in the presence of a free radical catalyst of a vinyl monomer in a polyol which comprises mixing the catalyst and the vinyl monomer in a static mixer and thereafter adding the catalyst-monomer mix to a polyol. The resulting dispersions are superior to those prepared in accordance with the processes of the prior art in regard to their low viscosity and narrow particle size distribution. These properties render the dispersions particularly useful in the preparation of urethane foams having enhanced load bearing properties as well as in the preparation of urethane films of superior clarity.

DESCRIPTION OF THE PREFERRED EMBODIMENT

In accordance with the process of the present invention the vinyl monomer or monomers are mixed with the free radical catalyst in a static mixer just prior to being added to the polyol in the reaction vessel. The free radical catalyst can be added directly to the mixer, it may be dispersed in a portion of the polyol and added to the mixer, or it may be dissolved in an inert organic solvent and added to the mixer. By adding a mixed stream of catalyst and monomer to the polyol a more homogeneous polymerization system is provided resulting in a graft copolymer dispersion of low viscosity and superior molecular weight distribution. It has been determined that static mixers provide the intimate blend of catalyst and monomer which is essential to the preparation of these graft copolymer dispersions. The mixing of monomer, catalyst and polyol cannot be done in an early step or in standard mixers because initiation of the polymerization reaction occurs, resulting in plugged feeding lines and dispersions of varying molecular weight distribution and high viscosities.

A motionless or static mixer is a duct-like mixing device without moving parts. It uses no external power except for the power loss due to the pressure drop of the fluids that pass through it. A static mixer is constructed of a pipe into which is inserted shaped elements that divide and swirl the fluid. Representative of such static mixers are the KENICS mixer, the Interfacial Surface Generator, the low pressure drop mixer and the Koch Sulzer mixer. All of these mixers achieve intimate blending of the catalyst and monomer by dividing and redividing the fluid stream.

The polyols which may be employed in the present invention are well known in the art. Both conventional polyols essentially free from ethylenic unsaturation such as those described in U.S. Pat. No. 3,383,351 and unsaturated polyols may be employed in the invention. Representative polyols essentially free from ethylenic unsaturation which may be employed in the present invention are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,451; 3,190,927, and 3,346,557.

Representative polyols include polyhydroxyl-containing polyesters, polyalkylene polyether polyols, polyhydroxy-terminated polyurethane polymers, polyhydroxyl-containing phosphorus compounds, and alkylene oxide adducts of polyhydric polythioethers, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group as well as those which contain an amino group and a —SH group may be used.

Any suitable hydroxyl-containing polyester may be used such as are obtained from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethylglutaric acid, $\alpha$-$\beta$-diethylsuccinic acid, isophthalic acid, terephthalic acid, hemimellitic acid, and 1,4-cyclohexanedicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, $\alpha$-methyl glucoside, pentaerythritol, and sorbitol. Also included with the term "polyhydric alcohol" are compounds derived from phenol such as 2,2-(4,4'-hydroxyphenol)-propane, commonly known as Bisphenol A.

Any suitable polyalkylene polyether polyol may be used such as the polymerization product of an alkylene oxide or of an alkylene oxide with a polyhydric alcohol having from 2 to 6 hydroxyl groups. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)propane and blends thereof having equivalent weights of from 250 to 5000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols containing at least two —SH groups such as 1,2-ethane dithiol, 1,2-propane dithiol, 1,3-propane dithiol, and 1,6-hexane dithiol; alkene thils such as 2-butene-1,4-dithiol; and alkyne thiols such as 3-hexyne-1,6-dithiol.

Suitable amines which may be condensed with alkylene oxides include aromatic amines such as aniline, o-chloroaniline, p-amino aniline, 1,5-diamino naphthalene, methylene dianiline, the condensation products of aniline and formaldehyde, and 2,4-diamino toluene; aliphatic amines such as methyl amine, triisopropanol amine, ethylene diamine, 1,3-propylene diamine, 1,4-butylene diamine, and 1,3-butylene diamine.

The unsaturated polyols which may be employed in the present invention may be prepared by the reaction of any conventional polyol such as those described above with an organic compound having both ethylenic unsaturation and a hydroxyl, carboxyl, or epoxy group or they may be prepared by employing an organic compound having both ethylenic unsaturation and a hydroxyl, carboxyl, or epoxy group as a reactant in the preparation of the conventional polyol. Representative of such organic compounds include unsaturated polycarboxylic acids and anhydrides such as maleic acid and anhydride, fumaric acid and anhydride, crotonic acid and anhydride, propenyl succinic anhydride, and halogenated maleic acids and anhydrides, unsaturated polyhydric alcohols such as 2-butene-1,4-diol, glycerol allylether, trimethylolpropane allylether, pentaerythritol allylether, pentaerythritol vinylether, pentaerythritol diallylether, and 1-butene-3,4-diol, unsaturated epoxides such as 1-vinylcyclohexane-3,4-epoxide, butadiene monoxide, vinyl glycidylether(1-vinyloxy-2,3-epoxy propane), glycidyl methacrylate and 3-allyloxypropylene oxide (allyl glycidylether). If a polycarboxylic acid or anhydride is employed to incorporate unsaturation into the polyols, it is then necessary to react the unsaturated polyol with an alkylene oxide, preferably ethylene or propylene oxide, to replace the carboxyl groups with hydroxyl groups prior to employment in the present invention. The amount of alkylene oxide employed is such to reduce the acid number of the unsaturated polyol to about one or less.

To prepare the unsaturated polyols of use in the present invention, from about 0.05 mole to about 3.0 moles, preferably from 0.30 mole to 1.50 moles, of said organic compound per mole of polyol is employed. The preparation of the unsaturated polyols employed in the present invention follows conventional prior art procedures such as disclosed in U.S. Pat. No. 3,275,606 and U.S. Pat. No. 3,280,077. Generally, this requires a reaction at a temperature between 0° C. and 130° C. Both acidic catalysts, such as Lewis acid catalysts and basic catalysts such as alkali metal hydroxides, may be used. In addition, a noncatalyzed reaction may be used employing temperatures between 50° C. and 200° C.

As mentioned above, the graft copolymers of the invention are prepared by the in situ polymerization of the above-described polyols with an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methyacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexylacrylate, phenyl acrylate, phenyl methacrylate, α-chloroacrylonitrile, N,N-dimethylacrylamide, N,N-dibenzylacrylamide, N- butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoro-ethylene, vinylidene fluoride, vinyl methyl ether, vinyl ethyl ether, vinyl propyl ethers, vinyl butyl ethers, vinly 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis($\beta$-chloroethyl)vinyl phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

The amount of ethylenically unsaturated monomer employed in the polymerization reaction is generally from 1 to 30%, preferably from 3 to 25%, based on the weight of the polyol. The polymerization occurs at a temperature between about 80° C. and 170° C., preferably from 105° C. to 135° C.

Illustrative catalysts which may be employed in the present invention are the well-known free radical type of vinyl polymerization catalysts, for example, the peroxides, persulfates, perborates, percarbonates, azo compounds, etc., including hydrogen peroxide, debenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-$\alpha$-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethyoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, $\alpha$-methylbenzyl hydroperoxide, $\alpha$-methyl-$\alpha$-ethyl benzyl hydroperoxide, Tetralin hydroperoxide, triphenylmethyl hydroperoxide, diphenylmethyl hydroperoxide, $\alpha$-$\alpha$-azo-2-methyl butyronitrile, $\alpha,\alpha'$-2-methyl heptonitrile, 1,1'-azo-1-cyclohexane carbonitrile, dimethyl $\alpha,\alpha'$-azo-isobutyrate, 4,4'-azo-4-cyanopentanoic acid, azobis(isobutyronitrile), persuccinic acid, diisopropyl peroxy dicarbonate, and the like; a mixture of catalysts may also be used. Azobis(isobutyronitrile) is the preferred catalyst. Generally from about 0.5 to about 10%, preferably from about 2 to about 5%, by weight of catalyst based on the weight of the monomer will be employed in the process of the invention.

In another embodiment of the present invention, the foregoing graft copolymer dispersions are employed in the preparation of polyurethane compositions, particularly polyurethane foams. The resulting polyurethane products exhibit marked improvements in load-bearing properties and tensile strength without substantial impairment of the other physical properties of the products. The polyurethane products are generally prepared by the reaction of the graft copolymer dispersions with an organic polyisocyanate, optionally in the presence of additional polyhydroxyl-containing components, chain-extending agents, catalysts, surface-active agents, stabilizers, blowing agents, fillers and pigments. Suitable processes for the preparation of cellular polyurethane plastics are disclosed in U.S. Reissue Patent 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-metnoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene 2,4,6-triisocyanate; and the tetraisocyanates such as 4,4'-dimethyldiphenylmethane-2,2',5,5'-tetraisocyanate.

Especially useful due to their availability and properties are tolylene diisocyanate, diphenylmethane-4,4'-diisocyanate and polymethylene polypehnylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As mentioned above, the graft copolymer dispersions are preferably employed along with another polyhydroxyl-containing component commonly employed in the art. Any of the polyhydroxyl-containing components which are described above for use in the preparation of the graft copolymer dispersions of the present invention may be employed along with the unsaturated polyols in the preparation of the polyurethane compositions of the present invention.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine, 1,4-cyclohexane-bis-(methylamine), ethylene diamine, diethylene triamine, N-(2-hydroxypropyl-)ethylene diamine, N,N'-di(2-hydroxypropyl)-ethylene diamine, piperazine, 2-methylpiperazine, morpholine, and dodecahydro-1,4,7,9b-tetrazaphenalene.

Any suitable catalyst may be used including tertiary amines, such as for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, and the like. Other suitable catalysts are, for example, tin compounds such as stannous chloride, tin salts of carboxylic acids, such as dibutyltin di-2-ethyl hexoate, tin alcoholates such as stannous octoate, as well as other organo metallic compounds such as are disclosed in U.S. Pat. No. 2,846,408.

A wetting agent or surface-active agent is genrally necesary for production of high grade polyurethane foam according to the present invention, since in the absence of same the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The following examples illustrate the nature of the invention. All parts are by weight unless otherwise stated. In the examples, the physical properties of the polyurethane were determined by the following ASTM tests:

| | |
|---|---|
| Tensile Strength | D-412 |
| Modulus | D-412 |
| Elongation | D-412 |
| Split Tear | D-470 |
| Compression Set | D-395 |
| Compression Load | D-1564 |
| Humid Aging | D-1564 |

In the Examples that follow, the KENICS static mixer employed can be identified as Part No. 37-04-005, 0.250 inch Tube OD, 0.188 inch Tube ID, 6 inch Tube Length and 21 Elements.

EXAMPLE I

A. Preparation Of An Unsaturated Polyether Polyol

A stainless steel autoclave equipped with a thermometer, stirrer, nitrogen source, inlet means and heat exchange means was charged with 21.8 parts of propylene glycol and 312 parts of a 325 molecular weight polyol prepared by the condensation in the presence of potassium hydoxide of four moles of propylene oxide with one mole of glycerol. The charge was purged with nitrogen and heated to 105° C. With constant stirring, a mixture of 4564 parts of propylene oxide and 41.6 parts (corresponding to 0.30 mole per mole of product) of allylglycidylether was gradually added to the reaction mixture over ten hours. Upon completion of the oxide addition, the reaction mixture was maintained at 105° C. for four hours. Thereafter, 870 parts of ethylene oxide was added over a period of 1.5 hours at a temperature of 105° C. After the addition was completed, the reaction mixture was maintained at 105° C. for an additional hour. The reaction mixture was cooled to 30° C. and discharged from the autoclave. The reaction product was treated with an adsorbent, filtered to remove the catalyst and stripped at 100° C. for 1 hour under less than five millimeters of mercury to remove volatiles. The product, a clear colorless liquid, had a hydroxyl number of 35, an acid number of 0.01, a refractive index at 25° C. of 1.4534, and a Brookfield viscosity at 25° C. of 900 cps.

B. Preparation Of Graft Copolymer Dispersion Employing KENICS Mixer

A reaction vessel equipped as described above was charged with 350 parts of the unsaturated polyol prepared in (A), above. Nitrogen was bubbled through the polyol for about one hour. With stirring and under a slight nitrogen flow, the charge was heated to 115° C. A stream of a mixture of 62 parts of acrylonitrile and 55 parts of styrene and a stream of 2.5 parts of azobis-(isobutyronitrile) in 150 parts of the unsaturated polyol were fed into a KENICS static mixer and continuously added to the charge over a period of 90 minutes at 115° C. Upon completion of the addition, the reaction mixture was maintained at 115° C. for 20 minutes. The reaction mixture was then stripped for 1 hour at 105° C. under less than 5 millimeters of mercury. The stripped reaction product was a homogeneous liquid dispersion having a Brookfield viscosity at 25° C. of 2000 cps. and a hydroxyl number of 28.

A graft copolymer dispersion was prepared from the same ingredients as employed above, differing in that the stream of monomers and the stream of catalyst plus polyol were added directly to the reactor in the manner described in U.S. Pat. No. 3,652,639. The product was a liquid dispersion of varying particle size distribution and having a Brookfield viscosity at 25° C. of 2230 cps.

EXAMPLE II

A. Preparation of Graft Copolymer Dispersion - Conventional Procedure

A reaction vessel equipped as described in Example I was charged with 332 parts of the unsaturated polyol described in Example I(A), above. Nitrogen was bubbled through the polyol for about 1 hour. With stirring and under a slight nitrogen flow, the charge was heated to 125° C. and a stream of 50 parts of acrylonitrile and 75 parts of styrene and a suspension of 2.5 parts of azobis(isobutyronitrile) in 168 parts of the unsaturated polyol was continuously added to the charge over a period of 90 minutes. Upon completion of the addition, the reaction mixture was maintained at 125° C. for 1 hour. The reaction mixture was then stripped for 20 minutes at 105° C. under less than 10 millimeters of mercury. The stripped reaction product was an off-white liquid having a Brookfield viscosity at 25° C. of 4940 cps. and a hydroxyl number of 28.

B. Preparation Of Graft Copolymer Dispersion Employing KENICS Mixer

A reaction vessel equipped as described above was charged with 332 parts of the unsaturated polyol described in Example I(A), above. Nitrogen was bubbled through the polyol for about one hour. With stirring and under a slight nitrogen flow the charge was heated to 125° C. A stream of 50 parts of acrylonitrile and 75 parts of styrene and a stream of 2.5 parts of azobis-(isobutyronitrile) in 168 parts of the unsaturated polyol were fed into a KENICS static mixer and continuously added to the charge over a period of 90 minutes at 125° C. Upon completion of the addition, the reaction mixture was maintained at 125° C. for 1 hour. The reaction mixture was then stripped for 1 hour at 105° C. under less than 10 millimeters of mercury. The stripped reaction product was an off-white liquid having a Brookfield viscosity at 25° C. of 2550 and a hydroxyl number of 28.

The above example is duplicated with the exception that a Koch Sulzer mixer is substituted for the KENICS mixer. A graft copolymer dispersion substantially as described above is obtained.

EXAMPLE III

A. Preparation Of An Unsaturated Polyether-Ester Polyol

A stainless steel autoclave equipped with a thermometer, stirrer, nitrogen source, inlet means and heat exchange means was charged with 5009 parts (1.6 moles) of a 3000 molecular weight polyol prepared by the reaction of propylene oxide with glycerol in the presence of potassium hydroxide. The charge was purged with nitrogen and heated to 103° C. With constant stirring, 245 parts (2.5 moles) of maleic anhydride was then added to the charge maintaining the temperature of the charge at 103° C. for 15 minutes. Then, 290 parts (5.0 moles) of propylene oxide was gradually added to the reaction mixture over 2.5 hours. Upon completion of the oxide addition, the reaction mixture was maintained at 103° C. for 2.5 hours at which time the reaction mixture was cooled to 30° C. and discharged from the autoclave. The reaction product was treated with an adsorbent, filtered to remove the catalyst and stripped at 100° C. for 1 hour under less than 10 millimeters of mercury to remove unreacted propylene oxide. The product, a clear golden yellow liquid, had a hydroxyl number of 52.2, an acid number of 0.6, a refractive index at 25° C. of 1.4544 and a Brookfield viscosity at 25° C. of 1200 cps.

B. Preparation Of Graft Copolymer Dispersion Employing KENICS Mixer

A reaction vessel equipped as described above was charged with 336 parts of the unsaturated polyether-ester polyol prepared in (A), above. Nitrogen was bubbled through the polyol for about 1 hour. With stirring and under a slight nitrogen flow, the charge was heated to 125° C. A stream of 58.2 parts of bis(β-chloroethyl)-vinyl phosphonate and 26.0 parts of styrene and a stream of 4.9 parts of azobis(isobutyronitrile) in 164 parts of the unsaturated polyol were fed into a KENICS mixer and continuously added to the charge over a period of one hour. Upon completion of the addition, the reaction vessel was maintained at 125° C. for 30 minutes and thereafter stripped for 30 minutes at 125° C. under less than 5 millimeters of mercury. The stripped reaction product was a homogeneous liquid dispersion having a Brookfield viscosity at 25° C. of 2225 cps.

A graft copolymer dispersion was prepared from the same ingredients as employed above, differing in that the monomer stream and the catalyst in polyol stream were added directly to the reaction. The resulting product was a liquid dispersion having a Brookfield viscosity at 25° C. of 2525 cps.

EXAMPLE IV

A reaction vessel equipped as described in Example I was charged with 332 parts of a polyol prepared by the reaction of ethylene oxide with the propylene oxide adduct of glycerol, said polyol having an ethylene oxide content of approximately 13% and an OH number of 35. Nitrogen was bubbled through the polyol for about one hour. With stirring and under a slight nitrogen flow, the charge was heated to 115° C. A stream of a mixture of 56 parts of acrylonitrile and 69 parts of styrene and a stream of 2.5 parts of azobis(isobutyronitrile) in 168 parts of the above polyol were fed into a KENICS static mixer and thereafter a single stream of catalyst, monomers and polyol was added to the charge over a period of 60 minutes at 115° C. Upon completion of the addition, the reaction mixture was maintained at 115° C. for 30 minutes. The reaction mixture was then stripped for 30 minutes at 115° C. under less than 5 millimeters of mercury. The stripped reaction product was a homogeneous liquid dispersion having a Brookfield viscosity at 25° C. of 2360 cps.

A graft copolymer dispersion was prepared from the same ingredients as employed above, differing in that the stream of monomers and the stream of catalyst in polyol were added directly to the reactor in the manner described in U.S. Pat. No. 3,652,639. The product was a liquid dispersion of varying particle size distribution and having a Brookfield viscosity at 25° C. of 2675 cps.

EXAMPLE V

A high resilient polyurethane foam was prepared from the polyol described in Example I(B). The ingredients employed in the preparation as well as the physical properties of the foam are presented below:

| Ingredients | Parts |
| --- | --- |
| Polyol of Example I(B) | 100 |
| Water | 2.7 |
| Triethylene diamine | 0.1 |
| N-ethylmorpholine | 0.46 |
| Dibutyltin dilaurate | 0.03 |
| Bis(2-N,N-dimethylamine-ethyl) ether | 0.1 |
| Polymethylene polyphenyl isocyanate | 6.8 |
| 80/20 2,4- 2,6-toluene diisocyanate | 27.2 |
| Physical Properties: | |
| Rise time, sec. | 115 |
| Density (core), pcf. | 2.52 |
| Tensile strength, psi. | 23.0 |
| Elongation, % | 120 |

-continued

| Ingredients | Parts |
|---|---|
| Tear Resistance, pi. | 2.5 |
| Compression load, psi. | |
| 25% deflection | 0.50 |
| 25% deflection, return | 0.42 |
| 50% deflection | 0.83 |
| Compression set, % | |
| 50% deflection | 15.5 |
| 90% deflection | 11.5 |
| Air flow, cfm. | 0.9 |
| Humid Aging | |
| Compression load, psi. | |
| 50% deflection | 0.41 |
| Compression set, % | |
| 50% deflection | 19.7 |
| 90% deflection | 18.4 |

The embodiments of the invention in which an exclusive property or privilege is claimed are defined as follows:

1. In a process for the preparation of a graft copolymer dispersion by the in situ polymerization in the presence of a free radical catalyst at a temperature between 80° C. and 170° C. of a vinyl monomer in a polyol having an equivalent weight of from 250 to 5000 the improvement which comprises mixing a stream of the catalyst with a stream of the monomer in a static mixer to achieve an intimate homogeneous blend of catalyst and monomer and thereafter adding the catalyst-monomer mix to the polyol.

2. The process of claim 1 wherein the vinyl monomer is selected from the group consisting of acrylonitrile, styrene and mixtures thereof.

3. The process of claim 1 wherein the free radical catalyst is azobis(isobutyronitrile).

4. The process of claim 1 wherein the polyol is a polyalkylene polyether polyol essentially free from ethylenic unsaturation.

5. The process of claim 4 wherein the polyol is an alkylene oxide adduct of glycerol.

6. The process of claim 1 wherein the polyol is an unsaturated polyol prepared by the reaction of an alkylene oxide with the reaction product of one mole of a polyalkylene polyether polyol with 0.3 mole to 1.5 moles of an organic dicarboxylic acid anhydride.

7. The process of claim 1 wherein the polyol is an unsaturated polyol prepared by the reaction of a polyhydric alcohol having from two to six hydroxyl groups with a mixture of propylene oxide and allyl glycidyl ether, said polyol having from 0.30 mole to 1.50 moles of unsaturation per mole of polyol.

8. The process of claim 1 wherein the temperature is between 105° C. and 135° C.

* * * * *